Figure 1:
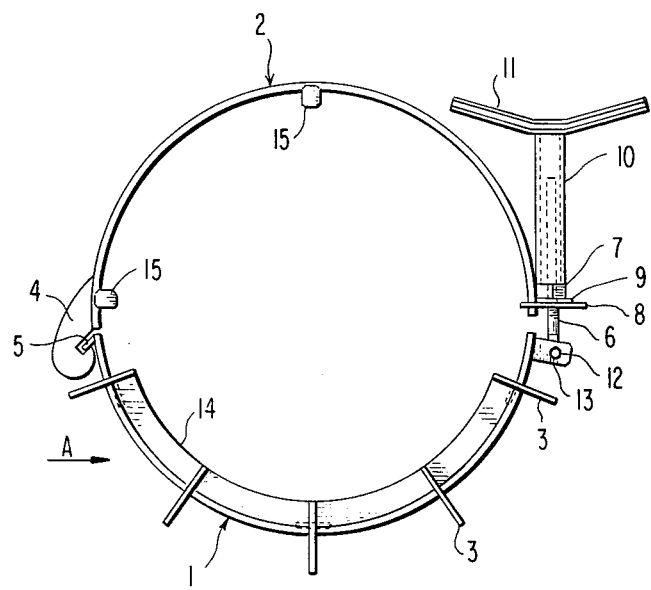

United States Patent [19]

Øygarden et al.

[11] 4,079,493
[45] Mar. 21, 1978

[54] CENTERING APPARATUS FOR LAYING OF TUBES

[76] Inventors: John Øygarden, Skoglivegen 1; Ludvig Naess, Limihogda 11, both of 3700 Skien, Norway

[21] Appl. No.: 637,796

[22] Filed: Dec. 4, 1975

[51] Int. Cl.² .................................... B25B 27/14
[52] U.S. Cl. ................................................. 29/272
[58] Field of Search ............................. 29/272, 282

[56] References Cited

U.S. PATENT DOCUMENTS

| | | | |
|---|---|---|---|
| 820,126 | 5/1906 | Phillips | 29/272 |
| 1,515,785 | 11/1924 | McDonald | 29/272 |

Primary Examiner—James L. Jones
Attorney, Agent, or Firm—Sughrue, Rothwell, Mion, Zinn and Macpeak

[57] ABSTRACT

A centering apparatus for use by the laying of heavy tubes of relatively large dimensions, especially for centering the spigot end of a tube relatively to the socket end of a positioned tube, and comprising a clamping device with at least two interconnectable members adapted to be attached to the socket end, and a guiding device for slidable guiding of the spigot end into the socket. The guiding device includes a number of brackets mounted to the interconnectable member enclosing the lower peripheral part of the socket end, which brackets project axially from said member and have guiding surfaces forming a chute onto which the tube to be laid down can be lowered to be pushed in centered position towards the adjacent tube end.

4 Claims, 3 Drawing Figures

CENTERING APPARATUS FOR LAYING OF TUBES

The present invention relates to a centering apparatus for use by the laying of heavy tubes and pipelines of relatively large dimensions, especially for centering the spigot end of a tube to be laid relatively to the socket end of a positioned tube, comprising a clamping device consisting of at least a pair of interconnectable members which are adapted to be attached to the peripheral surface of the socket end, and a guiding device for slidable guiding of said spigot end into the socket.

A pipe fitting tool of the above mentioned type is known from U.S. Pat. No. 1,065,387. This known tool comprises two semi-cylindrical hinged sections adapted to be attached on the flange of a tube, and a guiding portion in the form of a cylindrical extension. This tool with its long cylindrical guiding portion is intended for threaded tubes, and is not practically useable in ditches by the laying of tubes of large dimensions.

By laying of heavy pipelines and tubes of larger dimensions it has previously been a time-consuming and often difficult work to achieve accurate mutual centering of adjacent tube ends prior to the joining thereof. By laying of socket tubes according to the common joining methods there is used a packing ring in the joint between a socket end and a spigot end, and the joining must then be effected with great accuracy in order for the packing ring not to get displaced in the joint. By the introduction of a spigot end in the socket of a mounted or positioned tube one has, in the absence of practically useable centering apparatus, been dependent on building up the spigot end of the tube by means of a wedge arrangement in order to achieve correct elevation and latheral position in relation to the mounted tube. This work is time-consuming when one is to achieve an accurate centering under working conditions where there is lack of space and difficult access, for example in a ditch, and in addition the work is often made difficult because of bad soil or ground conditions.

Thus it is an object of the invention to provide an apparatus which enable easy and safe centering by the laying of tubes of relatively large dimensions, and which at the same time is independent of the ground conditions.

The above object is achieved by a centering apparatus of the type set forth above wherein, according to the invention, the guiding device includes a plurality of brackets mounted on one of the interconnectable members which is intended to enclose the lower peripheral part of the socket end, which brackets project axially from said member and have guiding surfaces forming together a chute onto which the tube end in question can be lowered to be pushed in centered position towards the adjacent tube end.

By means of the apparatus according to the invention one achieves safe centering, and in addition the apparatus can be easily and quickly assembled and disassembled. Thus, there is achieved a substantial increase of the capacity by the tube laying.

Figure 2:
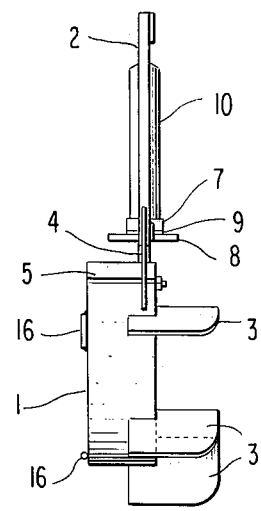
Figure 3:
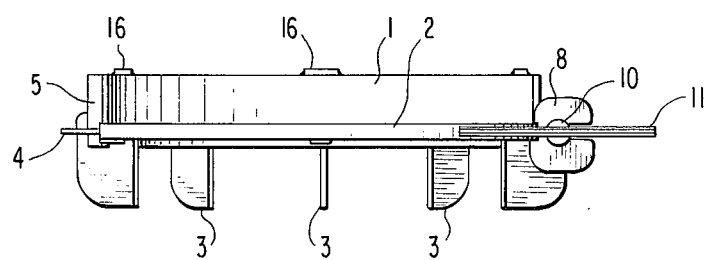

In order to facilitate the understanding of the invention an embodiment thereof will now be described more closely with reference to the accompanying drawings wherein, FIG. 1 shows a front view of a centering apparatus according to the invention, FIG. 2 shows the apparatus viewed in the direction of the arrow A in FIG. 1, and FIG. 3 shows the apparatus in FIGS. 1 and 2 viewed from above.

The apparatus shown in the drawings is especially adapted for centering the ends of cylindrical socket tubes. The apparatus includes a main member or assembly member 1 which is adapted to the actual tube shape and tube dimension, to be attached to the end of an installed or positioned tube (not shown), a holding device or member 2 for securing of the assembly member on the tube end, and a guiding device 3 for slidable support of the end of the tube (not shown) which is to be joined to the installed or positioned tube.

In the shown embodiment the assembly member 1 as well as the holding member 2 for the securing thereof essentially comprises semi-circular elements or members which in assembled position on a tube end encloses respective peripheral portions of the tube end. Thus the two members 1 and 2 have in pairs adjacent end parts, and suitable means are provided for interconnection of these end parts and for safe clamping and securing of the assembly member 1 on the tube end in question. In the shown embodiment one of these connection means consists of a hinged device in the form of a plate 4 attached to one end part and having a recess for receiving an engagement plate 5 on the adjacent end part. The other connection means is adapted for adjustable clamping and consists of a rod 6 pivotally attached to one end part, which rod is threaded at its free end and on which there is screwed on a nut member 7 which can be clamped against a holding plate 8 fixed on the adjacent or opposite end part, said holding plate being provided with a notch for introduction of the rod 6. A spacer 9 is placed between the nut 7 and the holding plate 8. In order to achieve easy clamping a tube 10 is fixed on the nut 7 which tube receives the threaded rod end and at its free end is provided with a handle 11 in the form of two projecting arms which enable a large torque by manual tightening of the nut. As shown the rod 6 can be pivotally attached by means of a bolt 12 which is passed through a hole in the associated rod end and through holes in a pair of projecting mounting brackets 13 fixed to the associated end part and between which the rod end is positioned.

The guiding device for slidable tube end support includes a number of brackets 3 attached to the assembly member 1 and projecting therefrom. The inward facing side edges of the brackets are so arranged that they form together a chute on which a tube end resting on the brackets can be pushed in centered position towards the end of the adjacent tube. By cylindrical tubes the guiding surfaces of the brackets form an essentially partial-cylindrical chute. In order to allow that a tube to be centered does not need to lie parallel to the foregoing, installed tube, it is advantageous that the guiding surfaces of the carrying brackets are slightly inclined from their point of attachment; so that they form a part of a tape-ring, frusto-conical guiding face towards the socket end. Suitably the tapering can allow that the tube which is to be laid down, is lying approximately 2° out of parallel, and this is a great advantage in curves and on hill-crests. The length of the brackets in the longitudinal direction of the tube is adapted for direct lowering of the tube end in question onto the brackets when the assembly member is mounted on and attached to the socket end of the installed tube. The spigot end of the tube which is to be mounted, can then be pushed directly into the socket, the spigot end being held in centered position on the brackets. For example, the tube can without any risk be pushed into place by means of an excavator shovel, when the socket end of the tube is suitably supported, e.g. on a "cushion" of planks.

In order to secure that the apparatus is not displaced during use on the tube end on which it is mounted, the assembly member 1 is provided with an upstanding flange member 14 resting against the end surface of the tube. With this continuous flange member 14 there is also obtained a good support and a stable attachment for the guiding brackets 3. For securing purposes the holding device 2 is also provided with suitable inwards projecting lugs 15. In the drawing there is shown a number of holding pieces 16 which are attached in order to prevent displacement in the opposite direction on the socket end. It will be appreciated that this arrangement is especially adapted for a specific tube dimension and a specific tube shape.

Since in practice it is the question of handling of heavy articles, the apparatus must be of strong construction, and is preferably made of iron, the different members being attached by means of welding. However, it is also conceivable to use other materials. For example the assembly and holding members can be made of flexible material so that the apparatus can be suitable for various tube dimensions. For this purpose these members can also be made extendable, or an articulated construction of the members can be used, possibly with links which can be taken out or inserted according to requirements. The guiding device can also be designed with brackets which are adjustable in radial direction, in order to achieve adaption to and appropriate centering by different dimensions and tube end embodiments.

The above embodiment is described in connection with tubes of the socket type, but the apparatus according to the invention can also be adapted for centering by the joining of other types of tubes and pipelines. In principle this can be achieved by different forming and mounting of the guiding device on the assembly member, without departing from the principal construction and operation of the apparatus.

We claim:

1. In a centering apparatus for use in the laying of heavy tubes and pipelines of relatively large dimension, particularly for centering a spigot end of a tube to be laid relatively to a socket end of a mounted tube, guiding means for the slidable guiding of said spigot end into the socket end, and means for clamping and supporting said guiding means upon a tube, the improvement comprising: a pair of upper and lower interconnectable semi-circular ring members which are adapted to enclose respective upper and lower peripheral parts of the mounted tube, said lower member having an arcuate flange thereon extending inwardly of the inner semi-cylindrical surface thereof, said flange being so disposed on said member as to abut against the end surface of the mounted tube, and wherein the guiding means comprises a plurality of axially extending brackets mounted on only the lower member of said pair of interconnectable members, said brackets secured to said arcuate flange and said lower member, and said brackets having guide surfaces forming together a guiding chute onto which the spigot end of the tube to be laid can be lowered directly to a centered position relative to the socket end of the mounted tube.

2. A centering apparatus according to claim 1, wherein said guiding surfaces form an essentially partial-cylindrical chute.

3. A centering apparatus according to claim 1, wherein said guiding surfaces are slightly inclined from their point of attachment, thereby forming a part of a tapering, frusto-conical guiding face.

4. A centering device according to claim 1, wherein the interconnectable member on which the lower brackets are mounted comprises a semi-circular ring member which at one end is connected by means of a hook coupling to an adjacent end of the opposite semi-circular ring member constituting an upper interconnectable member, and at its other end is provided with a screw connection for interconnection with an adjacent second end of said opposite ring member.

* * * * *